United States Patent
Hughes, Jr. et al.

(10) Patent No.: US 6,633,725 B2
(45) Date of Patent: Oct. 14, 2003

(54) LAYERED CODING OF IMAGE DATA USING SEPARATE DATA STORAGE TRACKS ON A STORAGE MEDIUM

(75) Inventors: Robert K. Hughes, Jr., Shoreline, WA (US); James H. Taylor, Mountlake Terrace, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/756,824

(22) Filed: Jan. 8, 2001

(65) Prior Publication Data

US 2001/0038746 A1 Nov. 8, 2001

Related U.S. Application Data

(63) Continuation of application No. 09/565,731, filed on May 5, 2000, now abandoned.

(51) Int. Cl.[7] .......................... H04N 5/91; H04N 11/00
(52) U.S. Cl. .......................... 386/123; 386/124; 386/37
(58) Field of Search .......................... 386/123, 124, 386/125, 126, 109, 111, 112, 27, 33, 45, 37, 40, 46, 92, 94, 117, 107, 38; 360/32

(56) References Cited

U.S. PATENT DOCUMENTS

| | | | |
|---|---|---|---|
| 4,754,342 A | * | 6/1988 | Duffy |
| 4,963,991 A | * | 10/1990 | Honjo |
| 5,377,051 A | * | 12/1994 | Lane et al. |
| 5,537,157 A | | 7/1996 | Washino et al. |
| 5,862,299 A | * | 1/1999 | Lee et al. |
| 6,363,119 B1 | * | 3/2002 | Oami |

OTHER PUBLICATIONS

Demos, Gary; "Temporal and Resolution Layering in Advanced Television," Nov. 27, 1999, 22 pages.

"ATSC Digital Television Standard," Advanced Television Systems Committee, Sep. 16, 1995, 74 pages.

* cited by examiner

*Primary Examiner*—Robert Chevalier
(74) *Attorney, Agent, or Firm*—Lee & Hayes, PLLC

(57) ABSTRACT

A source image is encoded into a base layer and an enhancement layer. The base layer represents a standard definition portion of the source image and the enhancement layer represents a high-resolution portion of the source image. The base layer is stored on a first data storage track of a storage medium, such as a DVD, and the enhancement layer is stored on a second data storage track of the storage medium. The first data storage track may be a default camera angle track and then second data storage track may be a second camera angle track. The data is formatted such that a standard definition device will not read the enhancement layer data. A high-resolution decoding system decodes the base layer and the enhancement layer simultaneously to generate a high-resolution image.

30 Claims, 7 Drawing Sheets

LAYERED CODING OF IMAGE DATA USING SEPARATE DATA STORAGE TRACKS ON A STORAGE MEDIUM

RELATED APPLICATIONS

This application is a continuation of U.S. patent Ser. No. 09/565,731, filed May 5, 2000, now abandoned.

TECHNICAL FIELD

This invention relates to image processing systems. More particularly, the invention relates to systems that process images using a layered coding technique in which different tracks on a storage medium store different layers of data that can render either a standard definition or high resolution image while storing the data efficiently.

BACKGROUND

Although a new high-definition television (HDTV) standard is emerging, most existing televisions and television receivers are low-resolution (i.e., standard definition televisions–SDTVs). Typically, the maximum resolution supported by a standard definition television is a horizontal resolution equivalent to 720 vertical lines by 480 interlaced horizontal scan lines with an effective resolution of approximately 350 lines of vertical resolution. The Advanced Television Systems Committee (ATSC) HDTV broadcast standard supports resolutions including 1280×720 lines per picture, which is approximately four times the number of pixels that can be resolved in a standard definition picture.

DVDs (Digital Video Discs or Digital Versatile Discs) are a popular medium for distributing video and audio/video programs, such as movies, musical concerts, and other video programs. The current DVD standard provides a maximum resolution of 720×480 for programs recorded on a DVD. Thus, the current DVD standard does not take advantage of the higher resolutions supported by HDTVs. Most DVDs are encoded from movie film or other storage media that supports the higher resolution of HDTVs. Therefore, the higher resolution version of the video program is typically available when the DVD is created, but the resolution is reduced to 720×480 (standard definition) when the DVD is manufactured.

As more HDTVs are manufactured and sold, more end users will desire DVDs having a higher resolution that matches the capability of their HDTV. However, to avoid obsoleting the large number of existing standard definition televisions and disc players, high-resolution DVD devices (e.g., high-resolution DVD players) will also need to support DVD programs recorded in the prior standard definition format.

One solution to this problem creates two different DVDs for each video program (e.g., one DVD that is encoded for standard definition devices and a different DVD encoded for high-resolution devices). This solution is undesirable because it requires the creation, distribution, and stocking of two different DVDs. Furthermore, until a large number of high-resolution DVD devices are sold in the marketplace, the cost of creating a small number of high-resolution DVDs may be too high.

Further, it would be undesirable to store two complete versions of a DVD title on the same disc (i.e., both a standard definition version and a high definition version). A high definition version would require the fall capacity of both physical layers of one side of a DVD, thus requiring an expensive dual-sided, dual-layer disc to also store the standard definition version of the title on the other side of the DVD. This is an inefficient and expensive solution because the standard definition data is stored twice on the same disc in two forms.

Therefore, a system is needed that allows both a standard definition version of a video program and a high-resolution version of the same program to be efficiently stored on a single DVD in a manner that allows the standard definition version to be compatible with existing equipment.

SUMMARY

Layered coding, which separates a high-resolution image into a base layer and an enhancement layer, is described. A storage medium, such as a DVD, has at least two different data storage tracks (also referred to as data streams). One data storage track is used to store the base layer and the second data storage track stores the enhancement layer. A standard definition image is generated by decoding the base layer data. A high-resolution image is generated by decoding and combining both the base layer data and the enhancement layer data.

In one embodiment, an encoding system encodes a base layer representing a standard definition portion of a source image and encodes an enhancement layer representing a high-resolution portion of the source image. The base layer is stored on a first data storage track of a storage medium and the enhancement layer is stored on a second data storage track of the storage medium.

In another embodiment, the first data storage track is a default camera angle track and the second data storage track is a second camera angle track.

In a particular implementation of the system, the storage medium is a DVD.

Another embodiment provides a decoding system that decodes a base layer from a first data storage track of a storage medium and decodes an enhancement layer from a second data storage track of the storage medium.

In a described implementation, the base layer and the enhancement layer are decoded simultaneously.

A particular embodiment decodes the base layer from a default camera angle track and decodes the enhancement layer from a second camera angle track.

DETAILED DESCRIPTION

Figure 1:
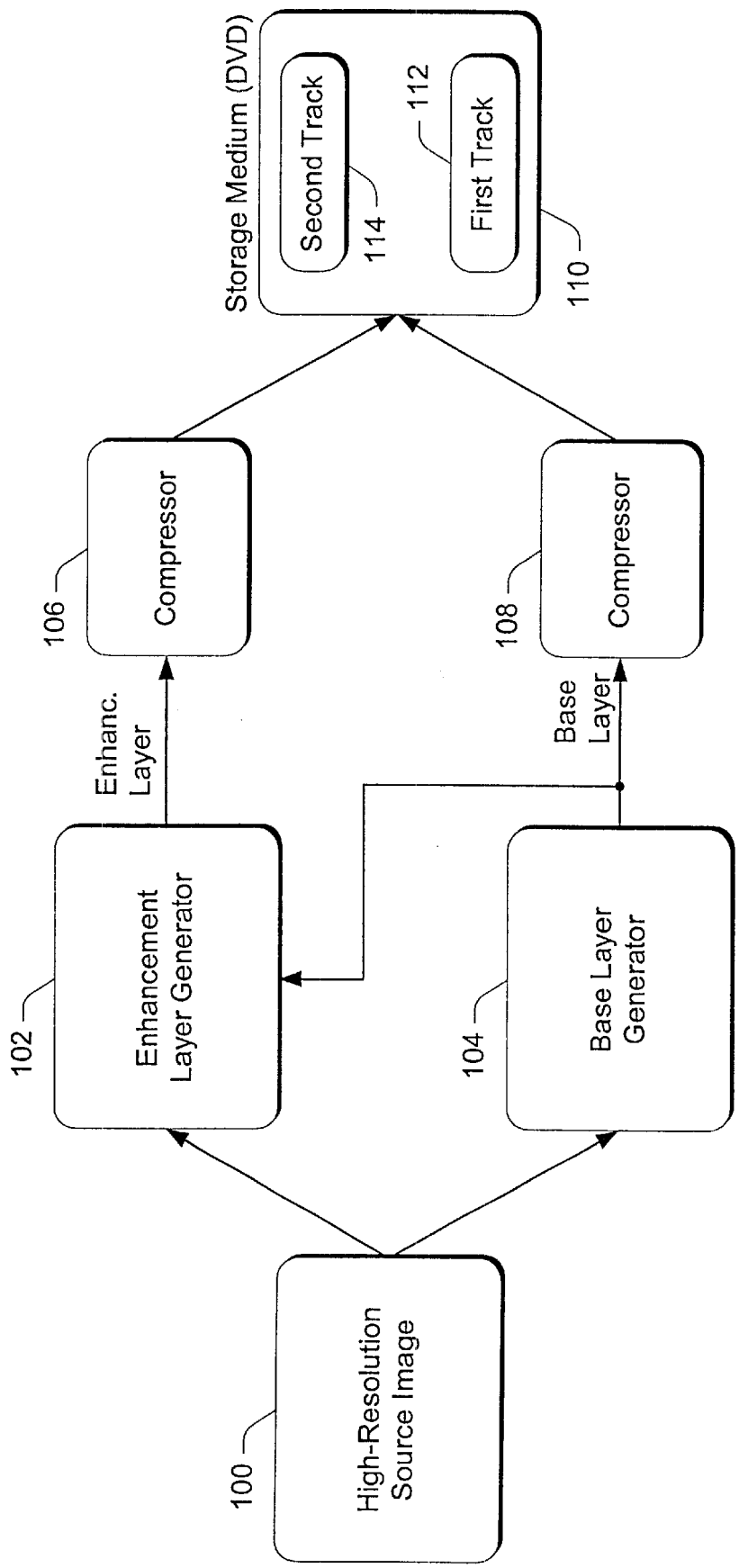
FIG. 1 illustrates a system that separates a high-resolution source image into a base layer and an enhancement layer, and stores the base layer and the enhancement layer in separate tracks on a storage medium.

The system described herein provides a layered coding mechanism that separates a high-resolution source image into a base layer having a resolution appropriate for a typical standard definition television system and an enhancement layer which, when combined with the base layer, provides an image resolution appropriate for a high-resolution television system. The base layer is used by standard definition televisions that cannot utilize the higher resolution portions of the image contained in the enhancement layer. The enhancement layer contains the high-resolution portions of the source image, such as the sharp edges and the portions of the image with bright color and high contrast. High-definition devices, such as high-definition DVD players, connected to a high-resolution display device, such as an HDTV (high-definition television), use both the base layer and the enhancement layer to generate a high-resolution image on the television. Alternatively, a user of an HDTV may choose to view a particular video program in standard definition mode. In this situation, the HDTV uses only the base layer to generate a standard definition image on the television.

The base layer and the enhancement layer are stored in separate tracks on a storage medium such as a DVD (digital video disc or digital versatile disc). Tracks may be interleaved or multiplexed so that data from all tracks is read simultaneously, or tracks may be stored in separate physical locations on the storage medium. A conventional, standard definition DVD player reads and decodes only the base layer information from the DVD. An enhanced DVD player supports high-resolution televisions by reading and decoding both the base layer information and the enhancement layer information from the DVD. Thus, instead of requiring two different types of DVDs (one for standard definition DVD players and another for high-resolution DVD players), a single DVD can support both standard definition and high-resolution DVD players by reading and decoding the appropriate track(s) from the DVD. Thus, the single DVD supports both standard definition television systems as well as high-resolution television systems. As used herein, the term "DVD player" includes any device capable of reading data from a DVD disc or other medium and processing the data to generate video signals in accordance with the DVD format specification.

As used herein, the terms "television", "television system", and "television receiver" shall be understood to include any type of video display system, including a television, a television receiver, a video projector, a flat panel display, and related video display systems. Additionally, the term "video" includes any form of electronic imagery, such as film or digitized image sequences. Although particular examples are described herein that use a DVD as the storage medium, it will be understood that any type of storage medium having at least two data storage tracks can be used to implement the systems described herein.

Further, particular examples are described herein with reference to HDTV systems. However, it will be understood that the teachings provided herein can be applied to any type of high resolution or high definition video display system. The terms "high resolution" and "high definition", as used herein, are interchangeable.

The DVD video disc format permits the recording of multiple interleaved video tracks for uses such as allowing multiple selectable "video angles" or "camera angles." For purposes of layered video resolution coding, the DVD video "video angles" or "camera angles" can be used as data tracks for video resolution layers.

FIG. 1 illustrates a layered encoding system that separates a high-resolution source image into a base layer and an enhancement layer, and stores the base layer and the enhancement layer in separate tracks on a storage medium, such as a DVD. A layered encoding system may also be referred to as an image encoding system. A high-resolution source image 100 is captured using a video camera or other device capable of capturing an image. A series of successive source images are captured to generate a video program (e.g., a television program or a movie).

The high-resolution source image 100 is communicated to an enhancement layer generator 102 and a base layer generator 104. The enhancement layer generator 102 generates an enhancement layer portion of the source image 100 and communicates the enhancement layer to a compressor 106. The enhancement layer generator 102 generates the enhancement layer by comparing the base layer data (received from the base layer generator 104) to the high-resolution source image data. For example, the enhancement layer generator 102 subtracts the base layer data from the high-resolution source image data, thereby leaving only the high-resolution portions of the image (i.e., the enhancement layer).

The base layer generator 104 generates a base layer portion of the source image 100 and communicates the base layer to a compressor 108. The compressor 106 generates a compressed version of the enhancement layer data and the compressor 108 generates a compressed version of the base layer data. In a particular embodiment of the invention, compressor 108 compresses the base layer data using the MPEG-2 (moving picture experts group) compression algorithm. Similarly, compressor 106 may compress the enhancement layer using the MPEG-2 compression algorithm. However, compressor 106 is not required to use the same compression algorithm as compressor 108. For example, compressor 106 may use a compression algorithm that utilizes three-dimensional wavelets to compress the enhancement layer information.

The compressed base layer is stored on a first data storage track 112 of storage medium 110. A data storage track is a collection of multiple sectors on a storage medium that can be read in sequence in real time. For example, a data storage track on a DVD may be a continuous series of data elements stored in a generally circular pattern that are read as the DVD rotates. Alternatively, a data storage track on a DVD may store two interleaved streams of data, such as enhancement layer data interleaved with base layer data, in multiple sectors scattered over the DVD.

The compressed enhancement layer is stored on a second data storage track 114 of storage medium 110. In this example, storage medium 110 is a DVD. The first and second data storage tracks 112 and 114 may be located on the same physical layer of the DVD or may be located on different physical layers of the DVD (a DVD can have two sides with two physical layers on each side).

Compressors 106 and 108 compress the enhancement layer and base layer data to reduce the storage space required to store the data. If the enhancement layer and/or the base layer do not require compression (i.e., the storage medium 110 has sufficient storage space without compressing the data), then compressor 106 and/or 108 can be eliminated from the system shown in FIG. 1.

As mentioned above, the DVD format supports multiple camera angles (or video angles). A viewer of the program stored on a DVD may select the default camera angle or one of several alternate camera angles. Although DVD technology supports multiple camera angles, programs are not necessarily recorded using multiple camera angles. Due to the added cost of recording a video program using multiple camera angles, many programs do not utilize the DVD tracks provided for the alternate camera angles.

The first track 112 of the DVD is the track assigned to the default camera angle. The base layer data is stored on this default camera angle track since the base layer information is read by both standard definition and high-resolution systems. To maintain backward compatibility with existing DVD players, the base layer data is stored using the format defined in the DVD video specification. The enhancement layer data is stored on the second track 114, which is assigned to an alternate camera angle. In this situation, the alternate camera angle track does not actually store data associated with an alternate camera angle, but instead stores data associated with the high-resolution portion of the source image. The enhancement layer contains special data sequences that allow a compatible high-definition DVD player to recognize that the camera angle track contains enhancement data. Although FIG. 1 illustrates tracks 112 and 114 as two separate tracks, in one embodiment the two tracks are interleaved, or time division multiplexed, so that the two tracks can be read simultaneously. One or both of the interleaved tracks are read by demultiplexing the interleaved data packets.

Figure 2:
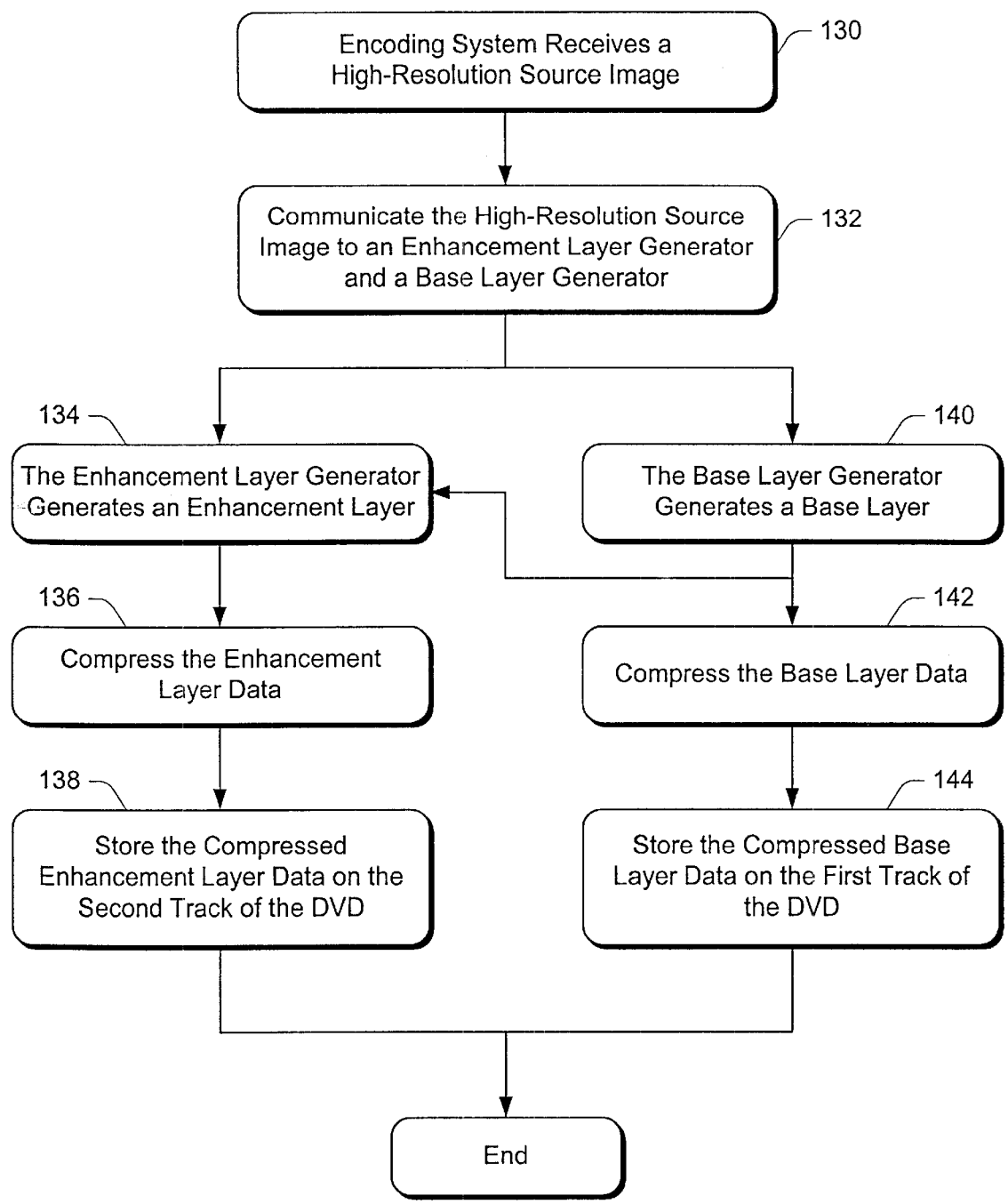
FIG. 2 is a flow diagram illustrating a procedure for encoding high-resolution source data into a base layer and an enhancement layer.

FIG. 2 is a flow diagram illustrating a procedure for encoding high-resolution source data into a base layer and an enhancement layer. The procedure illustrated in FIG. 2 can be implemented, for example, using the layered encoding system described above with respect to FIG. 1. The encoding system receives a series of high-resolution source images (step 130). Each source image is processed using the procedure of FIG. 2. The encoding system receives each high-resolution source image from a video camera or other image capture device (or video storage device). The high-resolution source image is communicated to an enhancement layer generator and a base layer generator (step 132).

The flow diagram branches from step 132 into two parallel paths that are processed concurrently. Following the left path, the enhancement layer generator generates an enhancement layer (step 134) using both the high-resolution source image and the base layer data generated by the base layer generator in step 140. The enhancement layer data is then compressed (step 136) and stored on the second track (i.e., the alternate camera angle track) of the DVD (step 138).

Following the right path of FIG. 2, the base layer generator generates a base layer (step 140). The base layer data is then compressed (step 142) and stored on the first track (i.e., the default camera angle track) of the DVD (step 144). At this point, the DVD contains both the compressed base layer data and the compressed enhancement layer data, stored on different tracks of the DVD. In an alternate embodiment, the base layer data and the enhancement layer data may be stored on an intermediate storage device, and later transferred onto a DVD. Furthermore, the base layer data and the enhancement layer data may be read by a device that manufactures the DVD by storing the appropriate data in the appropriate tracks.

Figure 3:
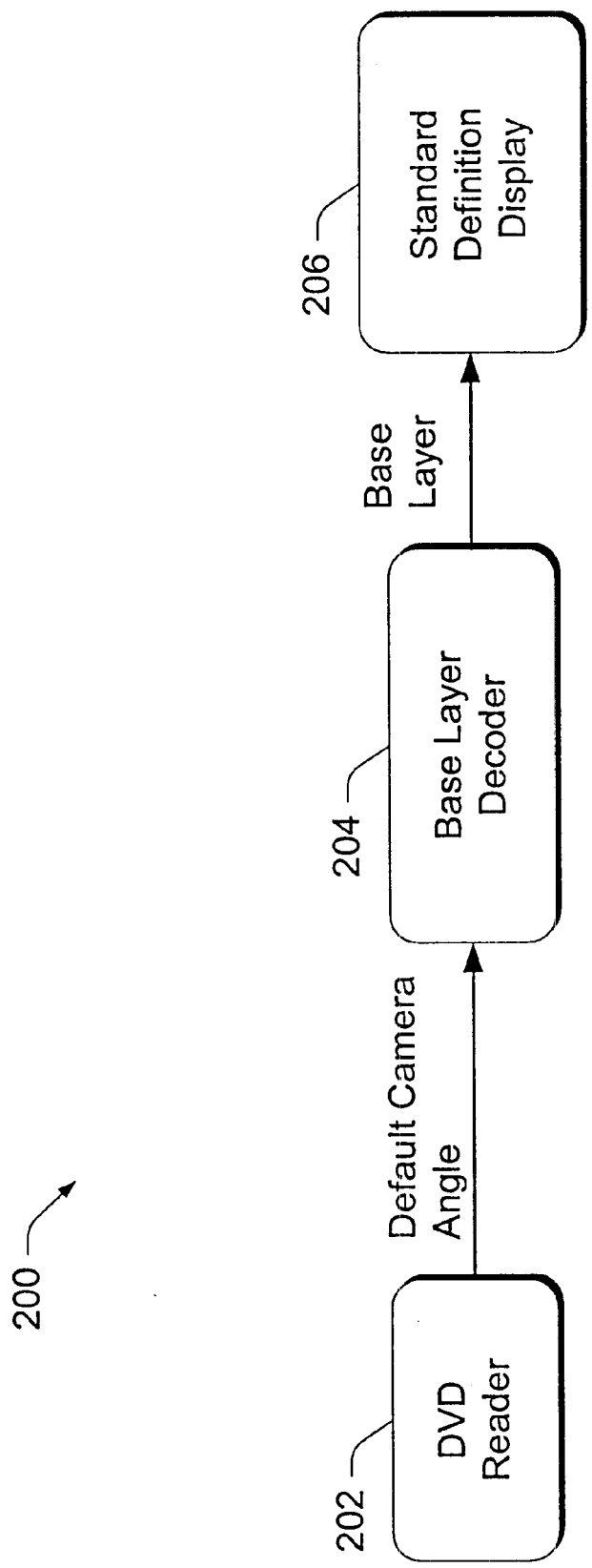
FIG. 3 illustrates a standard definition DVD decoding system.

FIG. 3 illustrates a standard definition DVD decoding system 200. A standard definition DVD reader 202 reads data from a default camera angle track of a DVD positioned in the DVD player. As mentioned above, the default camera angle track contains the base layer data. The DVD reader 202 may be located in a DVD player or other device coupled to a television for displaying the video program stored on the DVD. Alternatively, the DVD reader 202 may be located in a computer or other computing device for displaying the DVD's video program on a computer monitor or other display device.

A base layer decoder 204 decodes and decompresses the base layer information read from the DVD by reader 202. The output of the base layer decoder 204 is the uncompressed base layer data that is understood by a standard definition display 206. Standard definition display 206 displays the original sequence of images (in a standard definition mode). In the example of FIG. 3, base layer decoder 204 is shown as a separate device. In an alternate embodiment, the base layer decoder 204 may be incorporated into DVD reader 202 or standard definition display 206. Alternatively, the base layer data stream generated by base layer decoder 204 is transmitted over a network (or transcoded to another format) for distribution to a remote device (such as a video display device or a storage device).

Figure 4:
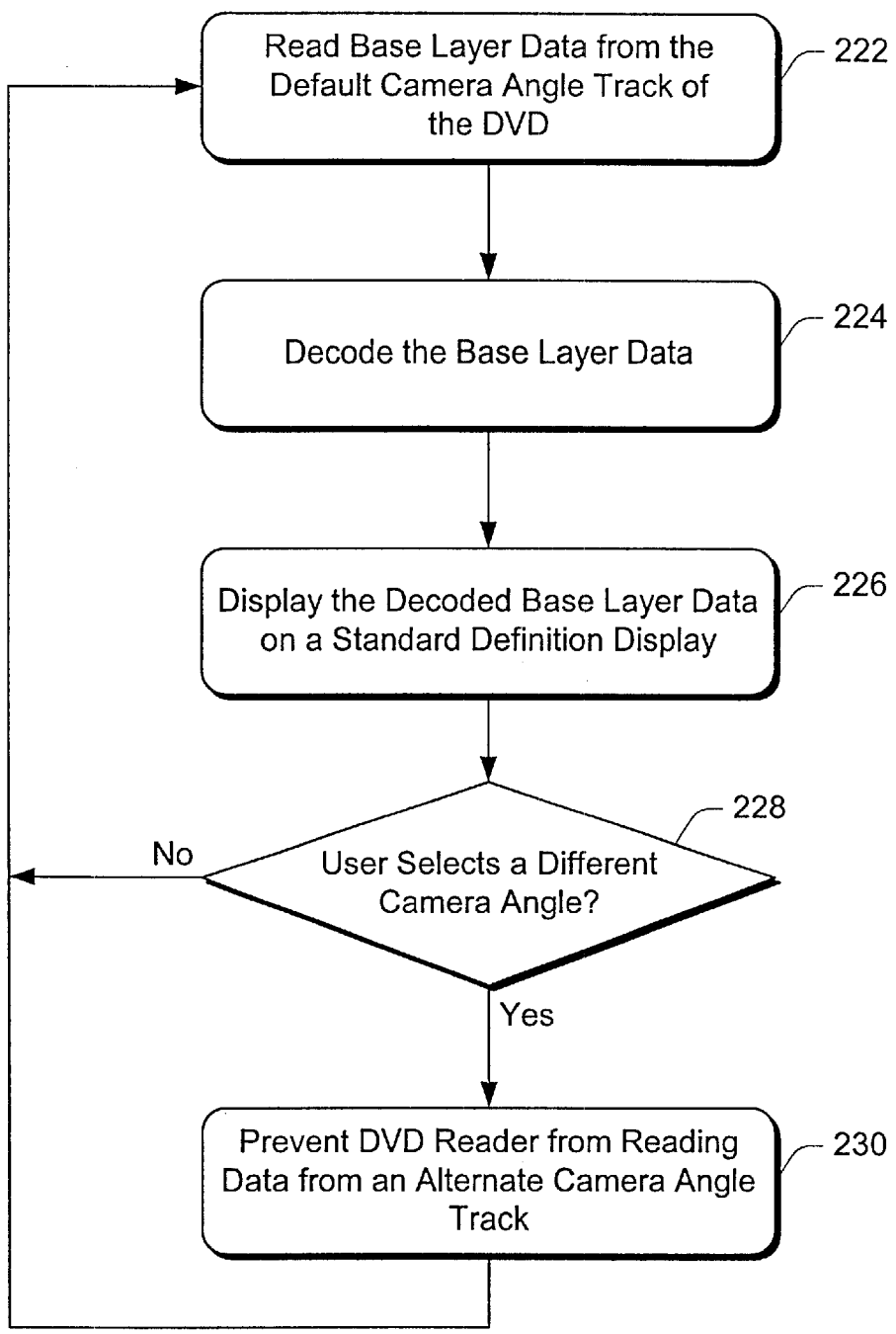
FIG. 4 is a flow diagram illustrating a procedure for decoding a standard definition image from a DVD.

FIG. 4 is a flow diagram illustrating a procedure for decoding a standard definition image from a DVD. A DVD reader reads the base layer data from the default camera angle track of the DVD (step 222). The base layer data is then decoded (step 224). The decoded base layer data is displayed on a standard definition display (step 226), thereby recreating the original sequence of images. If the user attempts to select a different camera angle, the DVD reader is prevented from reading data from an alternate camera angle track (step 230). In this procedure, only the standard definition image is being read from the DVD. Therefore, the DVD reader is limited to reading the base layer information contained in the default camera angle track. For example, the DVD reader may be incapable of interpreting the enhancement layer information contained in an alternate camera angle track. The procedure then continues reading base layer data from the default camera angle track of the DVD (step 222).

The DVD reader is prevented from reading data from an alternate camera angle track, such as the track that contains the enhancement layer data, by disabling certain user operations (e.g., disabling the ability to change camera angles) in the DVD reader or control circuitry. This disabling of user operations is supported by the DVD specification. Alternatively, each new segment of enhancement data stored on the second track may be interpreted by a standard definition reader as an instruction not to play that camera angle. Thus, if the user of the DVD reading device attempts to change to the second camera angle, the reader will read the instruction and either refuse to read the second camera angle or switch back to reading the default camera angle. Alternately, the second camera angle may contain data that causes a standard player to interpret it as blank video or as an empty angle. A high-resolution DVD reader, discussed below, understands that the second camera angle track contains enhancement layer data and processes the enhancement data accordingly.

Figure 5:
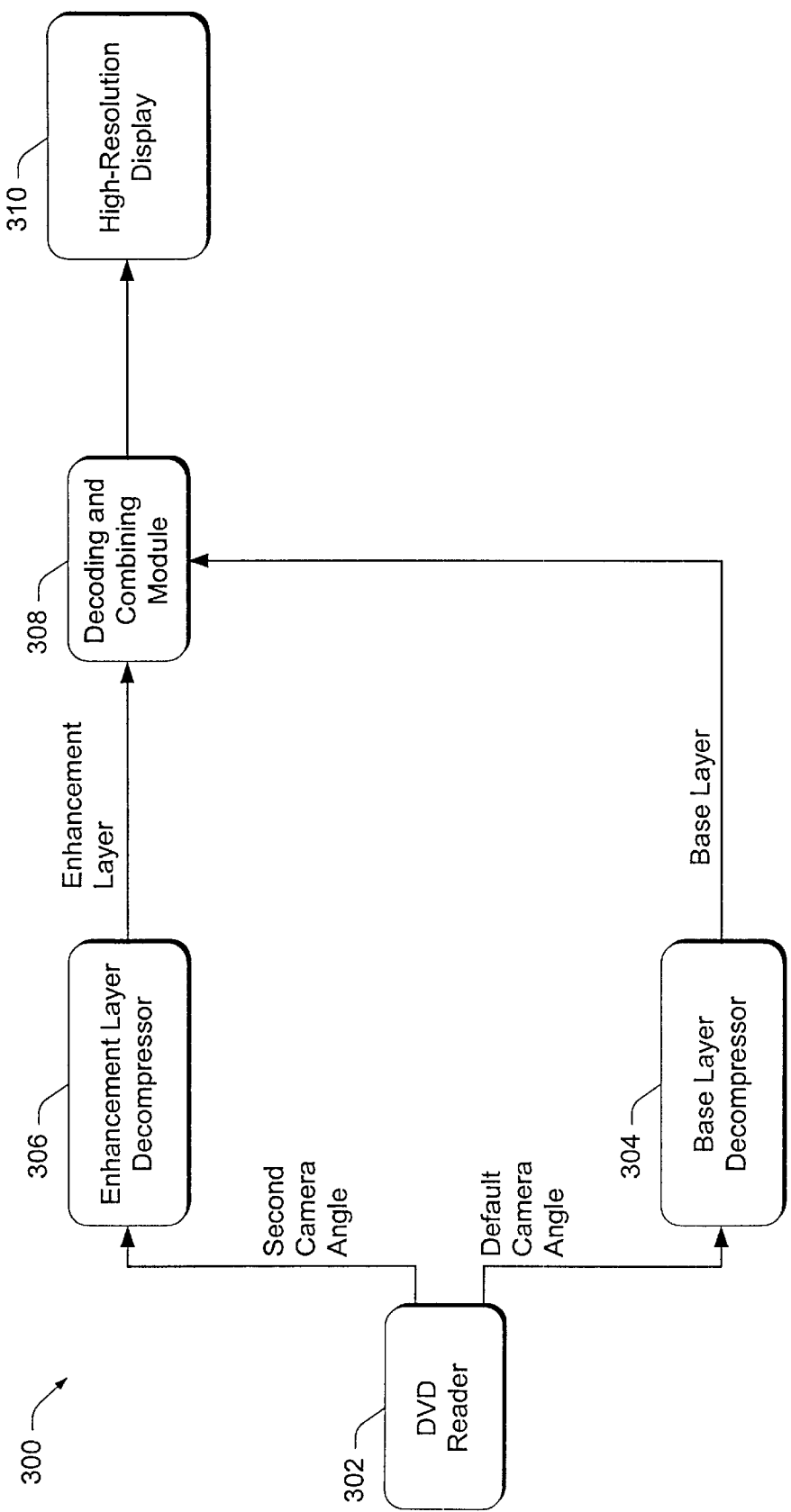
FIG. 5 illustrates a high-resolution DVD decoding system.

FIG. 5 illustrates a high-resolution DVD decoding system 300, which is capable of reading and processing both the base layer data and the enhancement layer data to generate a high-resolution video program. A high-resolution DVD reader 302 reads compressed base layer data from a default camera angle track of a DVD positioned in the DVD player. Additionally, the DVD reader 302 reads compressed enhancement layer data from a second camera angle track of the DVD positioned in the DVD player. The DVD reader 302 ignores any instructions at the beginning of the enhancement layer data segments that would be interpreted by a standard definition reader as an instruction not to play that camera angle. The DVD reader 302 understands that the second camera angle track contains enhancement layer data, the instructions directed toward standard definition DVD readers are ignored.

Since the DVD reader 302 reads both the default camera angle track and the second camera angle track, the DVD reader spins the DVD at twice the "standard rotational speed", or faster. In a particular embodiment, the standard rotational speed allows the DVD reader 302 to read one camera angle at approximately 8 Mbps (megabits per second). If the DVD reader spins the DVD at twice the standard rotational speed, then the DVD reader 302 can read two different camera angles simultaneously at approximately 16 Mbps.

A base layer decompressor 304 decompresses the compressed base layer data read from the DVD by reader 302. Similarly, an enhancement layer decompressor 306 decompresses the compressed enhancement layer data read from the DVD by reader 302. The outputs of decompressor 304 and decompressor 306 are coupled to a decoding and combining module 308, which decodes and combines the base layer data with the enhancement layer data to generate a high-resolution signal that is provided to and understood by a high-resolution display 310. High-resolution display 310 displays the original sequence of images in a high-resolution mode. In the example of FIG. 5, decompressors 304 and 306, and the decoding and combining module 308 are shown as separate devices. However, any one or more of the devices can be incorporated into DVD reader 302 and/or high-resolution display 310. In another embodiment, the data output from decoding and combining module 308 is transmitted over a network (such as the Internet) or other communication medium to a remote device (such as a video display device or a storage device).

Alternatively, the decoding and combining module 308 may generate an encoded high-definition MPEG-2 stream (or transcode to another encoded format), or could provide the decoded video to a distribution device (not shown) for transmission to remote devices. Although not shown in FIG. 5, the output of base layer decompressor 304 may also be coupled to a standard definition display device for displaying the video content at a standard resolution.

Figure 6:
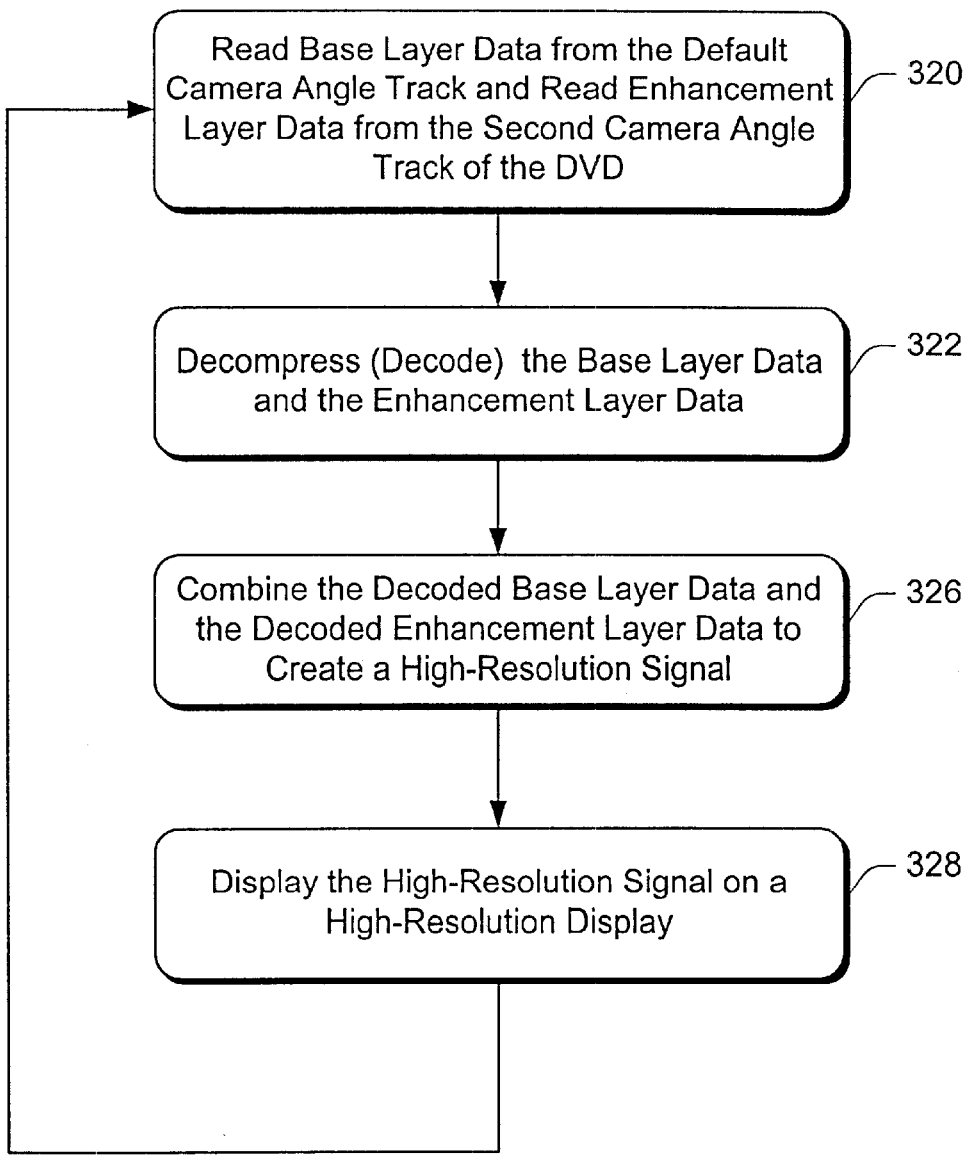
FIG. 6 is a flow diagram illustrating a procedure for decoding a high-resolution image from a DVD.

FIG. 6 is a flow diagram illustrating a procedure for decoding a high-resolution image from a DVD. A DVD reader reads base layer data from the default camera angle track and reads enhancement layer data from the second camera angle track of the DVD (step 320). Next, the procedure decompresses (decodes) the base layer data and the enhancement layer data (step 322). The decoded base layer data and the decoded enhancement layer data are combined to create a high-resolution signal (step 326). Finally, the high-resolution signal is displayed on a high-resolution display (step 328), which recreates the original sequence of images. The procedure then returns to step 320 to continues reading base layer data from the default camera angle track and reading enhancement layer data from the second camera angle track of the DVD.

Figure 7:
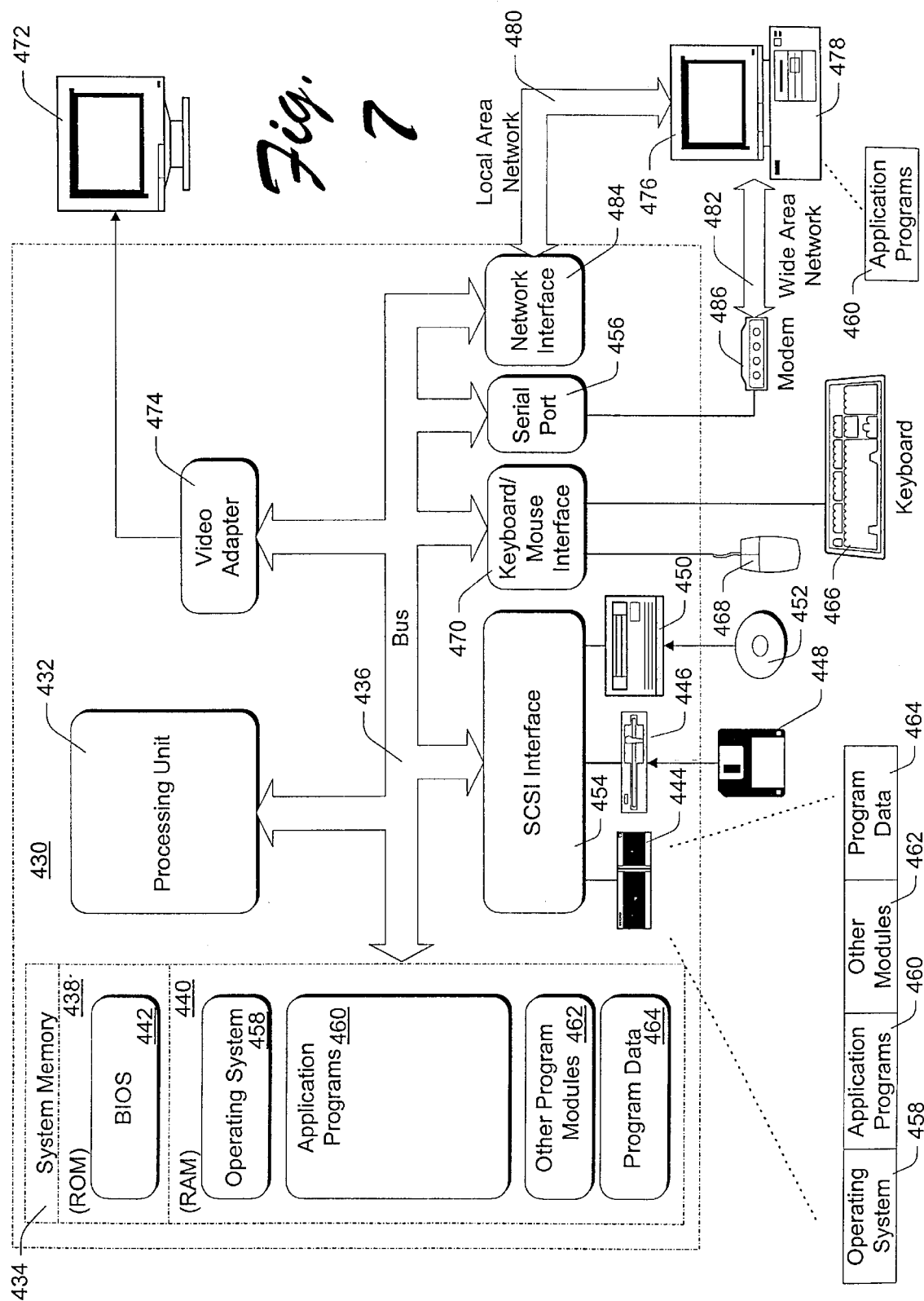
FIG. 7 is a block diagram showing pertinent components of a computer in accordance with the invention.

FIG. 7 is a block diagram showing pertinent components of a computer 430 that can be used with the present invention. A computer such as that shown in FIG. 7 can be used, for example, to perform various procedures necessary to encode or decode images, to store image data for later retrieval, read data from a DVD, or to display images on a display device coupled to the computer.

Computer 430 includes one or more processors or processing units 432, a system memory 434, and a bus 436 that couples various system components including the system memory 434 to processors 432. The bus 436 represents one or more of any of several types of bus structures, including a memory bus or memory controller, a peripheral bus, an accelerated graphics port, and a processor or local bus using any of a variety of bus architectures. The system memory 434 includes read only memory (ROM) 438 and random access memory (RAM) 440. A basic input/output system (BIOS) 442, containing the basic routines that help to transfer information between elements within computer 430, such as during start-up, is stored in ROM 438.

Computer 430 further includes a hard disk drive 444 for reading from and writing to a hard disk (not shown), a magnetic disk drive 446 for reading from and writing to a removable magnetic disk 448, and an optical disk drive 450 for reading from or writing to a removable optical disk 452 such as a CD ROM, DVD or other optical media. The hard disk drive 444, magnetic disk drive 446, and optical disk drive 450 are connected to the bus 436 by an SCSI interface 454 or some other appropriate interface. The drives and their associated computer-readable media provide nonvolatile storage of computer-readable instructions, data structures, program modules and other data for computer 430. Although the exemplary environment described herein employs a hard disk, a removable magnetic disk 448 and a removable optical disk 452, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 444, magnetic disk 448, optical disk 452, ROM 438, or RAM 440, including an operating system 458, one or more application programs 460, other program modules 462, and program data 464. A user may enter commands and information into computer 430 through input devices such as a keyboard 466 and a pointing device 468. Other input devices (not shown) may include a microphone, joystick, game pad, satellite dish, scanner, or the like. These and other input devices are connected to the processing unit 432 through an interface 470 that is coupled to the bus 436. A monitor 472 or other type of display device is also connected to the bus 436 via an interface, such as a video adapter 474. Video adapter 474 can be, for example, a DVD decoder combined with a SVGA display adapter to provide a SVGA signal to a SVGA monitor. Video adapter 474 can be implemented in hardware or software. In addition to the monitor 472, personal computers typically include other peripheral output devices (not shown) such as speakers and printers.

Computer 430 commonly operates in a networked environment using logical connections to one or more remote computers, such as a remote computer 476. The remote computer 476 may be another personal computer, a server, a router, a network PC, a peer device or other common network node, and typically includes many or all of the elements described above relative to computer 430, although only a memory storage device 478 has been illustrated in FIG. 7. The logical connections depicted in FIG. 7 include a local area network (LAN) 480 and a wide area network (WAN) 482. Such networking environments are commonplace in offices, enterprise-wide computer networks, intranets, and the Internet.

When used in a LAN networking environment, computer 430 is connected to the local network 480 through a network interface or adapter 484. When used in a WAN networking environment, computer 430 typically includes a modem 486 or other means for establishing communications over the wide area network 482, such as the Internet. The modem 486, which may be internal or external, is connected to the bus 436 via a serial port interface 456. In a networked environment, program modules depicted relative to the personal computer 430, or portions thereof, may be stored in the remote memory storage device. It will be appreciated that the network connections shown are exemplary and other means of establishing a communications link between the computers may be used.

Generally, the data processors of computer 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention can be implemented in hardware, software, or a combination of hardware, software, and/or firmware. For example, one or more application specific integrated circuits (ASICs) could be programmed to carry out the invention.

Although an exemplary system has been described using a two-layer coding system (i.e., base layer and enhancement layer), alternate embodiments may encode a source signal into any number of layers, each of which is stored as a separate track on a DVD.

Thus, a system has been described that provides a layered coding system that separates a high-resolution source image into a base layer and an enhancement layer, each of which are stored on a separate track of the storage medium. In a particular application, the base layer is stored on a default camera angle track and the enhancement layer is stored on a second camera angle track of the storage medium.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
   decoding a base layer from a first data storage track of a storage medium, wherein the base layer represents a standard definition portion of an encoded image;
   decoding an enhancement layer from a second data storage track of the storage medium if the data stored on the second data storage track is identified as enhancement layer data, wherein the enhancement layer data represents a high-resolution portion of the encoded image; and
   wherein decoding a base layer is performed simultaneously with decoding an enhancement layer.

2. A method as recited in claim 1 wherein the storage medium is a DVD.

3. A method as recited in claim 1 wherein the first data storage track is a default camera angle track.

4. A method as recited in claim 1 wherein the second data storage track is a second camera angle track.

5. A method as recited in claim 1 further including communicating the base layer to a standard definition television.

6. A method comprising:
   decoding a base layer from a first data storage track of a storage medium, wherein the base layer represents a standard definition portion of an encoded image;
   decoding an enhancement layer from a second data storage track of the storage medium if the data stored on the second data storage track is identified as enhancement layer data, wherein the enhancement layer data represents a high-resolution portion of the encoded image; and
   combining the base layer and the enhancement layer to generate a high-resolution image.

7. A method as recited in claim 1 wherein the method is executed by a television.

8. A method as recited in claim 1 wherein the method is executed by a device capable of reading a DVD.

9. One or more computer-readable memories containing a computer program that is executable by a processor to perform the method recited in claim 1.

10. An apparatus comprising:
    a reading device to read base layer data from a first track of a storage medium and to read enhancement layer data from a second track of the storage medium;
    a decoder coupled to the reading device to decode any encoded data read from the first and second tracks of the storage medium; and
    a combining module coupled to the decoder and the reading device to combine data read from the first track and data read from the second track into video program data.

11. An apparatus as recited in claim 10 wherein the apparatus is a device capable of reading a DVD.

12. An apparatus as recited in claim 10 wherein the apparatus is a computer.

13. An apparatus as recited in claim 10 wherein the storage medium is a DVD.

14. An apparatus having a reader capable of reading base layer data from a first data storage track of a storage medium and reading enhancement layer data from a second data storage track of the storage medium, the apparatus comprising a combining module coupled to the reader to combine data read from the first data storage track and data read from the second data storage track into video program data.

15. An apparatus as recited in claim 14 wherein the first data storage track is a default camera angle track.

16. An apparatus as recited in claim 14 wherein the second data storage track is a second camera angle track.

17. An apparatus as recited in claim 14 wherein the base layer data represents a standard resolution portion of a source image and the enhancement layer data represents a high-resolution portion of the source image.

18. An apparatus as recited in claim 14 wherein the combining module generates a high-resolution image.

19. One or more computer-readable media having stored thereon a computer program that, when executed by one or more processors, causes the one or more processors to:

decode a base layer from a first camera angle track of a storage medium, wherein the base layer represents a standard definition portion of an encoded image;

decode an enhancement layer from a second camera angle track of the storage medium, wherein the enhancement layer represents a high-resolution portion of the encoded image; and wherein the base layer and the enhancement layer are decoded simultaneously.

20. One or more computer-readable media as recited in claim 19 wherein the storage medium is a DVD.

21. One or more computer-readable media as recited in claim 19 wherein the first camera angle track is a default camera angle track.

22. One or more computer-readable media as recited in claim 19 wherein the one or more processors further communicate the base layer to a standard definition display device.

23. One or more computer-readable media having stored thereon a computer program that, when executed by one or more processors, causes the one or more processors to:

decode a base layer from a first camera angle track of a storage medium, wherein the base layer represents a standard definition portion of an encoded image;

decode an enhancement layer from a second camera angle track of the storage medium, wherein the enhancement layer represents a high-resolution portion of the encoded image; and combine the base layer and the enhancement layer to generate a high-resolution image.

24. A method as recited in claim 6 wherein the storage medium is a DVD.

25. A method as recited in claim 6 wherein the first data storage track is a default camera angle track.

26. A method as recited in claim 6 wherein the second data storage track is a second camera angle track.

27. A method as recited in claim 6 further including communicating the base layer to a standard definition television.

28. A method as recited in claim 6 wherein the method is executed by a television.

29. A method as recited in claim 6 wherein the method is executed by a device capable of reading a DVD.

30. One or more computer-readable memories containing a computer program that is executable by a processor to perform the method recited in claim 6.

* * * * *

UNITED STATES PATENT AND TRADEMARK OFFICE
CERTIFICATE OF CORRECTION

PATENT NO. : 6,633,725 B2  Page 1 of 1
DATED : October 14, 2003
INVENTOR(S) : Hughes, Jr. et al.

It is certified that error appears in the above-identified patent and that said Letters Patent is hereby corrected as shown below:

<u>Column 1,</u>
Line 65, replace "fall" with -- full --.

Signed and Sealed this

Third Day of February, 2004

JON W. DUDAS
*Acting Director of the United States Patent and Trademark Office*